Feb. 27, 1940.    L. V. PETTINATI    2,192,064
DEMOUNTABLE WHEEL
Filed Aug. 11, 1938    2 Sheets-Sheet 1
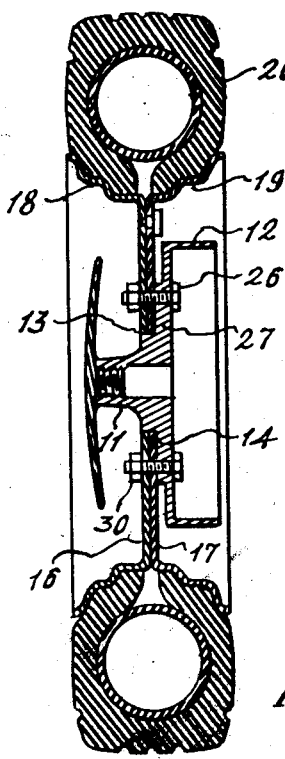
Fig. 2
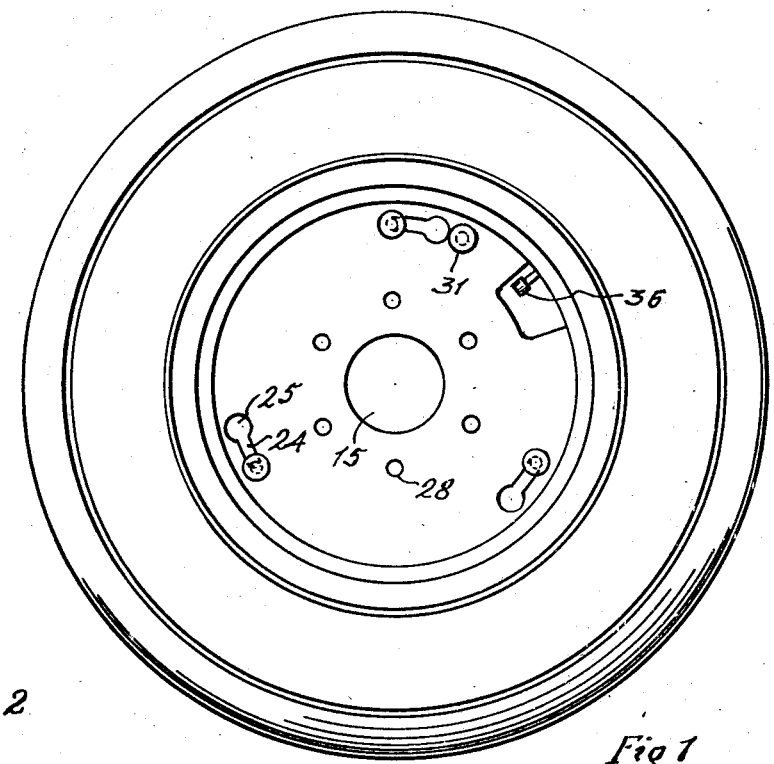
Fig. 1
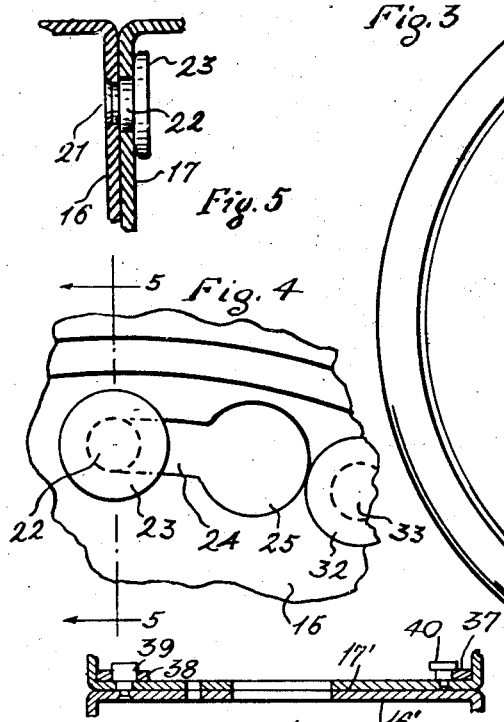
Fig. 3
Fig. 5
Fig. 4
Fig. 11
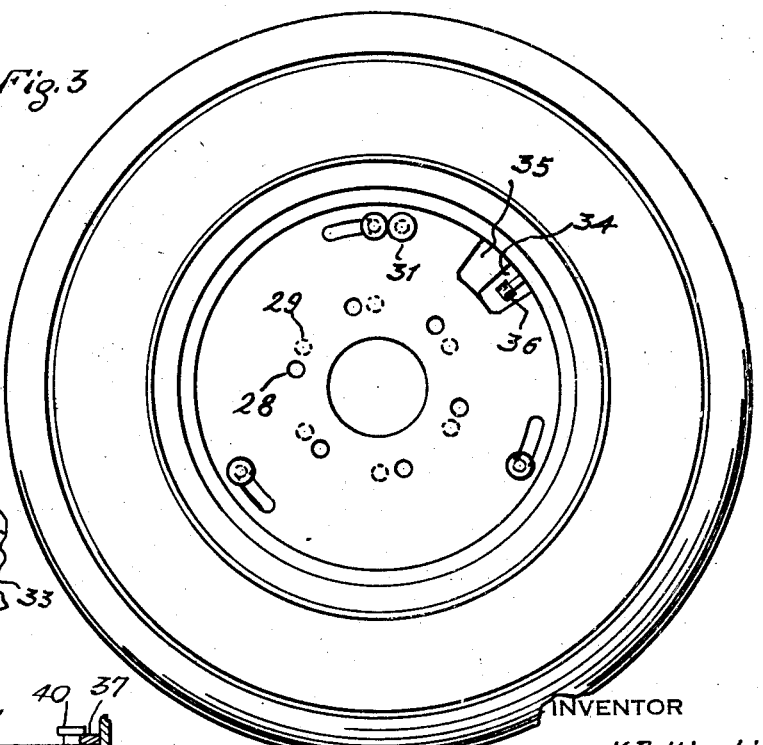
INVENTOR
Lawrence V. Pettinati
BY
ATTORNEY Feb. 27, 1940. L. V. PETTINATI 2,192,064
DEMOUNTABLE WHEEL
Filed Aug. 11, 1938 2 Sheets-Sheet 2

INVENTOR
Lawrence V. Pettinati
BY
ATTORNEY

Patented Feb. 27, 1940

2,192,064

UNITED STATES PATENT OFFICE 2,192,064

DEMOUNTABLE WHEEL

Lawrence V. Pettinati, New York, N. Y.

Application August 11, 1938, Serial No. 224,403

6 Claims. (Cl. 301—63)

This invention relates to wheels and more particularly refers to improvements in wheels equipped with pneumatic tires, of the type where the wheel is composed of two separable members in order to facilitate the mounting of the tire thereon and its ready removal.

In wheels of this type it is essential to provide for an absolutely positive tire retaining action; at the same time it is also essential that the construction of the wheel be as simple as possible and that the operations necessary to assemble or take it apart require a minimum amount of time.

The primary object of the present invention accordingly is to provide a demountable wheel, composed of two separable disk members, adapted to hold between them either a solid or pneumatic tire, said two disk members being connectable to each other by relative angular displacement in a radial plane, and being positively prevented from relative angular displacement in a reverse direction, when they are mounted on the hub in their assembled condition, in the usual manner.

Another object is to provide a wheel of the character specified composed of two disk members so designed as to require but one single operation in order to be connected to each other or taken apart.

A further object is to provide a demountable wheel adapted to afford a positive tire retaining action, said wheel being composed of a minimum number of parts and requiring a minimum of time and effort for its manipulation.

A still further object is to provide, in a wheel of the character specified comprising two disk members arranged side by side and adapted to be connected to or disconnected from each other by relative angular displacement in a radial plane, means of a simple and efficient character for producing the relative angular displacement of the two disk members even though it should be necessary to overcome some frictional or other resistance causing a binding action between the two disk members.

Other objects and advantages of the present invention will more fully appear as the description proceeds and will be set forth and claimed in the appended claims.

My invention is illustrated by way of example in the accompanying drawings, in which:

Fig. 1 is a side view in elevation of a wheel embodying my invention in its assembled condition;

Fig. 2 is a vertical cross section thereof;

Fig. 3 is a side view in elevation of the same wheel with its disk members moved to the position where they can be separated from each other;

Fig. 4 is a fragmentary side view, in an enlarged scale, illustrating means for connecting the two disk members to each other;

Fig. 5 is a fragmentary transversal section through line 5—5 of Fig. 4;

Fig. 11 is a horizontal section through line 11—11 of Fig. 6.

Figure 8:
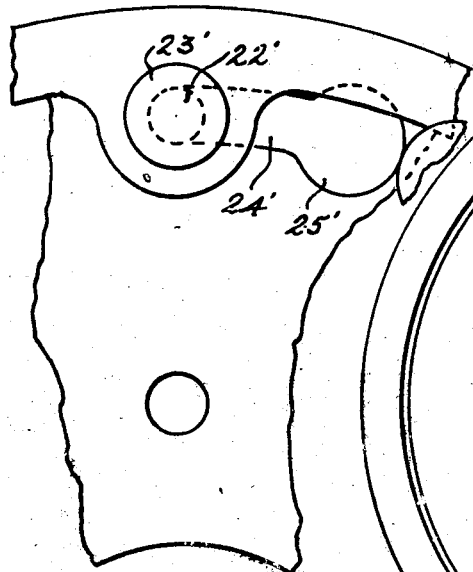
Fig. 8 is a fragmentary side view in elevation, in an enlarged scale, illustrating the manner in which the two disk members are connected to each other.

Referring to Figs. 1 to 5, 11 designates the hub of the wheel shown with a brake drum 12 formed integral therewith, although for the purposes of my invention the brake drum may be attached to a flange formed in the hub in the usual manner, if desired.

The hub is shown turned down at 13 so as to form a rabbeted circular shoulder or seat 14, adapted to receive and register with central opening 15 of the two disk members 16, 17, forming part of the wheel assembly.

Referring more particularly to Fig. 2 it will be seen that the said disk members are substantially flat disks abutting side to side against each other, said disks having outwardly extending peripheral annular portions 18, 19, forming retaining flanges for the tire 20.

The two disk members are connectable to each other by means of a circumferential series of studs carried by one of said disk members and a corresponding series of keyhole slots provided in the other member, adapted to receive and interlock with said studs.

In the wheel illustrated, disk member 16 is shown provided with a circumferential series of studs 21, having a stem portion 22, and an enlarged flat head 23, the length of said stem portion being substantially equivalent to the thickness of the other disk member 17.

Said disk member 17 is shown provided with a corresponding series of segmental keyhole slots 24, the width of which substantially corresponds to the diameter of stem portion 22 of the studs, said slots having at one end an enlarged portion 25 through which may be inserted the head 23 of the corresponding stud.

It is obvious that by virtue of this construction when the two disk members are placed side by side with the heads 23 of the studs projecting from one of the disk members in juxtaposition with the enlarged openings 25 in the other disk member, said heads 23 can be inserted through said openings 25 until the two disk members abut against each other. If now the two disk members are angularly displaced in relation to each other so as to cause the stem portion of the studs to enter the corresponding slots 24, as shown in Figs. 1 and 4, the two disk members will be interlocked so that they cannot again be separated from each other unless they are once more brought to their original relative angular position, shown in Fig. 3.

The two disk members in their assembled condition, shown in Figs. 1 and 2, are detachably mounted on the hub by means of the usual circumferential series of screw bolts 26, passing through the flange portion 27 of the hub, and to this end said disk members are each provided with a circumferential series of bolt openings 28, 29, registering with one another when at the end of the relative angular displacement of the two disk members the stem portions 22 of the studs have reached the end of the slots 24, as shown in Figs. 1 and 4.

It is thus seen that the wheel can be mounted on the hub only when the two disk members are in their interlocking position, and that when the wheel is thus mounted on the hub the two disk members are positively restrained against relative angular displacement and are effectively maintained in their operative position, shown in Figs. 1 and 2.

It is obvious that the mounting of the tire between the two disk members and its removal therefrom is a comparatively simple matter. In order to insert the tire in position it is sufficient to mount it on one of the disk members, then to place the other disk member against the former by causing the head 23 of the studs to pass through enlarged openings 25 of the slots, as shown in Fig. 3, and then to turn one disk member with respect to the other to the position shown in Fig. 1 where the bolt holes 28, 29 are in register with one another. The wheel can then be mounted on the hub by causing the bolts 26 to pass through openings 28, 29, and securing the wheel to the hub by means of nuts 30, in the usual manner.

In order to remove the tire it is sufficient to dismount the wheel from the hub by releasing nuts 30 and then to angularly displace one disk member with respect to the other in the reverse direction in order to once more bring the two disk members to the position of Fig. 3 where they can be separated.

Since the tire is usually removed for repairs or replacement when it is in its deflated condition, there is no pressure exerted by the tire against the sides of the retaining flanges 18, 19, and, therefore, the two disk members can be turned by hand with comparative ease.

In order to prevent the possibility of the two disk members being moved beyond the position in which they can be separated, where the heads 23 of the studs might overlap the edge of the openings 25, I prefer to provide a stop member, such as shown at 31, said stop member being, for instance, the head 32 of a stud 33, said head 32 projecting from the surface of disk 17 and acting as a positioning means for the head 23 of one of the studs 21, limiting the movement of said head 23 to the position where it exactly registers with enlarged opening 25 of the corresponding slot 24, as shown in Fig. 3.

The peripheral portion of each disk member is preferably provided with a segmental opening 34, 35, to accommodate the valve casing 36, said openings registering with each other when the two disk members are in their interlocking position, shown in Fig. 1, and being sufficiently wide in a circumferential direction to still provide room for the valve casing when the two disk members are in their other extreme position shown in Fig. 3.

Under certain conditions it might be difficult to rotate the two disk members with respect to each other by hand. Such a condition might arise when after a long period of use the abutting surfaces of the disk members might be found to stick to each other due to rust or other causes. It could also arise merely on account of the wheels being of extra large size as may be the case, for instance, in connection with wheels used for heavy trucks and airplanes. In such cases it becomes desirable to provide means whereby the manual efforts of the operator may be more effectively utilized in assembling and disassembling the two disk members.

A simple and effective arrangement which may be used to this end is illustrated in Figs. 6 to 10. The wheel illustrated in these figures is exactly the same as the one which I have just described except for some slight changes and additions, and is composed of two disk members 16', 17', disk member 16' carrying a circumferential series of studs having a stem portion 22' and a head 23', and disk member 17' having a corresponding series of slots 24' having an enlarged end portion 25'. Said two disk members also having a central opening 15' for mounting on the hub and a circumferential series of bolt holes 28', 29', as previously described.

Instead of being provided with through openings 34, 35, through which the valve casing 36 may extend, the disk members are in this case shown as being outwardly embossed, as at '34', so as to form a chamber accommodating but concealing the valve stem. If desired, the disk member can also be provided with a through opening 35' through which the end of the valve casing can be reached for inflating purposes.

The means for effecting the angular displacement of one disk member with respect to the other comprise a ring 37 concentric with and abutting against the side of disk member 17', said ring having a circumferential series of lugs 38, each having an opening 39 registering with the head 23' of a corresponding stud, said heads being inserted through said openings.

Said ring 37 is rotatable with respect to disk member 17' and can, therefore, share the angular displacement of disk member 16' with respect to disk member 17'.

Said ring 37 is retained in its position of abutment against the surface of disk member 17' by positioning studs 40 having an enlarged head 41 overlapping said ring, said heads 41 also serving in this case as stop means limiting the relative movement of the two disk members in the releasing direction, a function performed by stud 31 in the arrangement previously described. This positioning action of studs 40—41 is clearly shown in Figs. 7 and 9.

A segmental portion of the inner surface of ring 37 is provided with teeth so as to form a segmental rack 42, and disk member 17' carries a pinion 43 rotatably mounted thereon meshing with said rack. Said pinion is provided with a square opening 44, within which can be detachably inserted the square shank of a crank handle, shown in dotted lines at 45 in Fig. 7.

In correspondence of pinion 44, which is shown as being held in position by a retaining flange 46 projecting from the inner surface of disk member 17', disk member 16' is provided with a segmental opening 47, making it possible for the relative angular displacement of the two disk members to take place.

Figure 6:
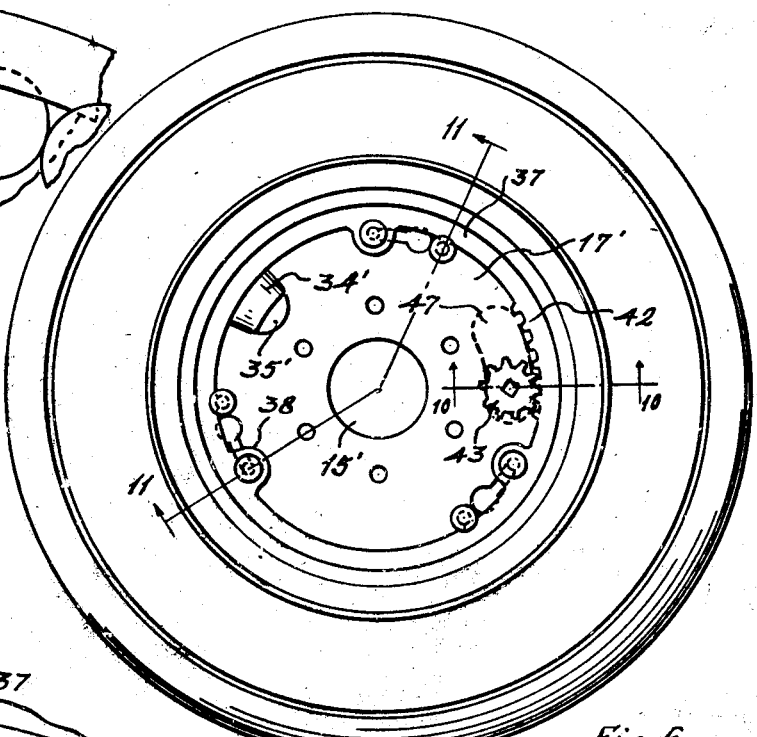
Fig. 6 is a side view in elevation of a similar wheel equipped with means for producing a relative angular displacement of the two disk members to and from their interlocking position, said wheel being shown in its normal or operative condition.
Figure 9:
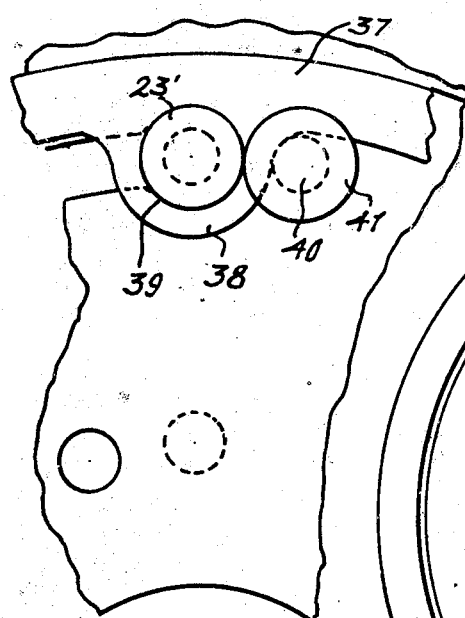
Fig. 9 is a similar view showing the position in which the two disk members can be separated from each other.
Figure 7:
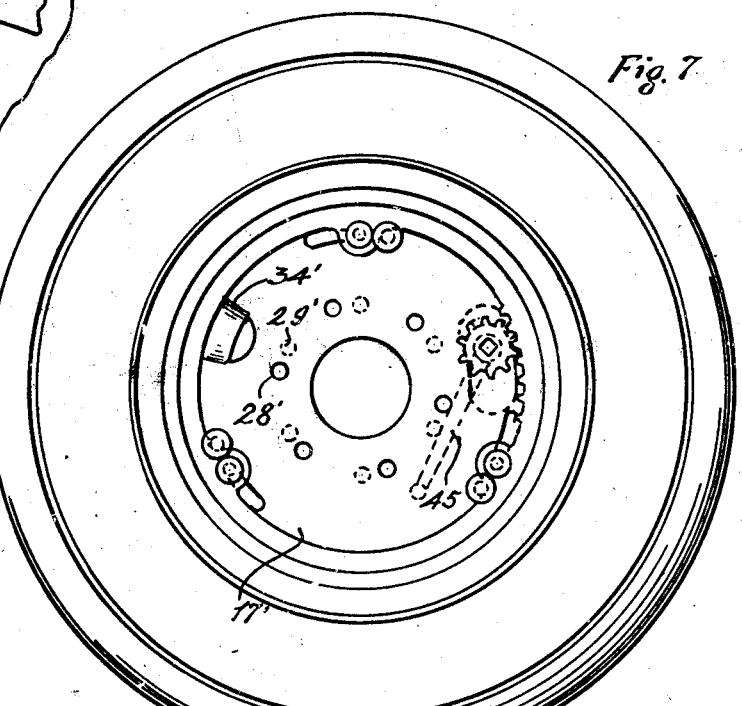
Fig. 7 is a side view in elevation of the same wheel where the two disk members have been moved to the position where they can be separated from each other.
Figure 10:
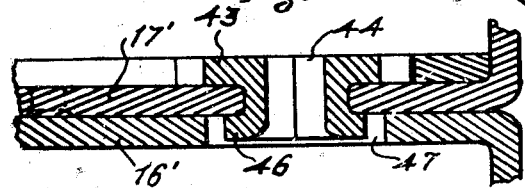
Fig. 10 is a fragmentary horizontal section, in an enlarged scale through line 10—10 of Fig. 6.

By referring to Figs. 6 and 8, in which the two disk members are in their operative or interlocking position, it will be seen that if the crank handle 45 is inserted in the opening of pinion 43 and is then turned in a clockwise direction disk member 17' will be caused to rotate in a counterclockwise direction with respect to disk member 16' to the position shown in Fig. 7, where the two disk members can be separated from each other in the manner previously explained.

Although in a broad sense it may be stated that the two disk members are still manually operated, it is obvious that in this case the action of the operator's hand can be more effectively applied and the force exerted by him will be multiplied in proportion to the ratio between the radius of the pinion and the length of the crank handle; a positive action will, therefore, result.

It is, of course, possible to effect the movement of the two disk members by means different from those shown and described; similarly it is also possible to vary some of the constructional details of the wheel embodying my invention without departing from the inventive idea.

The drawings should, therefore, be understood as being intended for illustrative purposes only and not in a limiting sense.

I accordingly reserve the right to carry my invention into practice in all those ways and manners which may enter, fairly, into the scope of the appended claims.

I claim:

1. In a wheel, two circular disk members each having a web portion and a tire retaining rim portion outwardly extending therefrom, means for effecting an interlocking connection of the web portion of one disk member with the web portion of the other when said web portions are placed against each other, by relative angular displacement of said disk members in the plane of their web portions, and means comprising a rack concentric with and associated with one of said disk members and a pinion carried by the other in mesh with said rack for effecting said relative angular displacement.

2. In a wheel, two circular disk members each having a web portion and a tire retaining rim portion outwardly extending therefrom, one of said web portions having a circumferential series of keyhole slots formed with an enlarged end portion, the other having a corresponding series of studs projecting from its surface and adapted to interlock with said slots, each stud having a stem portion of a diameter corresponding to the width of said slots, and a larger head adapted to enter the enlarged end portion of the corresponding slot, the length of said stem portion substantially corresponding to the thickness of the slotted web portion, whereby when the heads of said studs are inserted through said enlarged end portions and the web portions are placed against each other, an interlocking connection between said two disk members can be effected by relative angular displacement thereof causing the stem portions of said studs to enter said slots, and means comprising a rack concentric with and associated with one of said disk members and a pinion carried by the other in mesh with said rack for effecting said relative angular displacement of the two disk members in either direction.

3. In a wheel, two circular disk members each having a web portion and a tire retaining rim portion outwardly extending therefrom, one of said web portions having a circumferential series of keyhole slots formed with an enlarged end portion, the other having a corresponding series of studs projecting from its surface and adapted to interlock with said slots, each stud having a stem portion of a diameter corresponding to the width of said slots, and a larger head adapted to enter the enlarged end portion of the corresponding slot, the length of said stem portion substantially corresponding to the thickness of the slotted web portion, whereby when the heads of said studs are inserted through said enlarged end portions and the web portions are placed against each other, an interlocking connection between said two disk members can be effected by relative angular displacement thereof causing the stem portions of said studs to enter said slots, means comprising a rack concentric with and associated with one of said disk members and a pinion carried by the other in mesh with said rack for effecting said relative angular displacement of the two disk members in either direction, and stop means limiting the relative angular movement of said two disk members in the releasing direction, to the position where the heads of said studs exactly register with said enlarged end portions.

4. In a wheel, two circular disk members each having a web portion and a tire retaining rim portion outwardly extending therefrom, one of said web portions having a circumferential series of keyhole slots formed with an enlarged end portion, the other having a corresponding series of studs projecting from its surface and adapted to interlock with said slots, each stud having a stem portion of a diameter corresponding to the width of said slots, and a larger head adapted to enter the enlarged end portion of the corresponding slot, the length of said stem portion substantially corresponding to the thickness of the slotted web portion, whereby when the heads of said studs are inserted through said enlarged end portions and the web portions are placed against each other, an interlocking connection between said two disk members can be effected by relative angular displacement thereof causing the stem portions of said studs to enter said slots, and means for effecting said relative angular displacement of the two disk members in either direction, said means comprising a ring rotatably mounted on the slotted web portion, engaging the stud heads projecting therefrom, and means also mounted on said slotted web portion, actuating said ring in one or the other direction.

5. In a wheel, two circular disk members each having a web portion and a tire retaining rim portion outwardly extending therefrom, one of said web portions having a circumferential series of keyhole slots formed with an enlarged end portion, the other having a corresponding series of studs projecting from its surface and adapted to interlock with said slots, each stud having a stem portion of a diameter corresponding to the width of said slots, and a larger head adapted to enter the enlarged end portion of the corresponding slot, the length of said stem portion substantially corresponding to the thickness of the slotted web portion, whereby when the heads of said studs are inserted through said enlarged end portions and the web portions are placed against each other, an interlocking connection between said two disk members can be effected by relative angular displacement thereof causing the stem portions of said studs to enter said slots, means for effecting said relative angular displacement of the two disk members in either direction, said means comprising a ring rotatably mounted on the slotted web portion, engaging the stud heads projecting therefrom, and means also mounted on said slotted web portion, actuating said ring in one or the other direction, and stop means limiting the relative angular movement of said two disk members in the releasing direction, to the position where the heads of said studs exactly register with said enlarged end portions.

6. In a wheel, two circular disk members each having a web portion and a tire retaining rim portion outwardly extending therefrom, one of said web portions having a circumferential series of keyhole slots formed with an enlarged end portion, the other having a corresponding series of studs projecting from its surface and adapted to interlock with said slots, each stud having a stem portion of a diameter corresponding to the width of said slots, and a larger head adapted to enter the enlarged end portion of the corresponding slot, the length of said stem portion substantially corresponding to the thickness of the slotted web portion, whereby when the heads of said studs are inserted through said enlarged end portions of the web portions are placed against each other, an interlocking connection between said two disk members can be effected by relative angular displacement thereof causing the stem portions of said studs to enter said slots, and means for effecting said relative angular displacement of the two disk members in either direction, said means comprising a toothed ring rotatably mounted on the slotted web portion, engaging the stud heads projecting therefrom, and a pinion, also rotatably mounted on said slotted web portion, meshing with said toothed ring, for rotating said ring in one or the other direction.

LAWRENCE V. PETTINATI.